United States Patent
Cao

(10) Patent No.: US 11,028,023 B2
(45) Date of Patent: *Jun. 8, 2021

(54) METHOD FOR PREPARING MESOPOROUS SOUND-ABSORBING MATERIAL PARTICLES AND MESOPOROUS SOUND-ABSORBING MATERIAL PARTICLES

(71) Applicant: Goertek Inc., Shandong (CN)

(72) Inventor: Xiaodong Cao, Shandong (CN)

(73) Assignee: GOERTEK, INC., Shandong (CN)

( * ) Notice: Subject to any disclaimer, the term of this patent is extended or adjusted under 35 U.S.C. 154(b) by 176 days.

This patent is subject to a terminal disclaimer.

(21) Appl. No.: 15/781,297

(22) PCT Filed: May 18, 2016

(86) PCT No.: PCT/CN2016/082475
§ 371 (c)(1),
(2) Date: Dec. 1, 2018

(87) PCT Pub. No.: WO2017/092243
PCT Pub. Date: Jun. 8, 2017

(65) Prior Publication Data
US 2019/0092700 A1  Mar. 28, 2019

(30) Foreign Application Priority Data
Dec. 3, 2015  (CN) .......................... 201510888059.3

(51) Int. Cl.
*C04B 38/10*  (2006.01)
*C04B 38/06*  (2006.01)
(Continued)

(52) U.S. Cl.
CPC ........ *C04B 38/067* (2013.01); *C04B 38/0045* (2013.01); *C04B 38/0054* (2013.01);
(Continued)

(58) Field of Classification Search
CPC .... C04B 2111/52; G10K 11/165; H04R 31/00
See application file for complete search history.

(56) References Cited

U.S. PATENT DOCUMENTS

2007/0207186 A1*  9/2007  Scanlon ............... A61F 2/91
                                                424/424
2012/0088036 A1*  4/2012  Greenhill ............ B32B 1/08
                                                427/532
(Continued)

FOREIGN PATENT DOCUMENTS

CN         1958457 A      5/2007
CN       101024503 A      8/2007
(Continued)

OTHER PUBLICATIONS

Wang, Meng, et al., "Research Progress of Porous Alumina Ceramics," Applied Chemical Industry, vol. 42, No. 8, Aug. 31, 2013, 9 pages.
(Continued)

*Primary Examiner* — Michael A Salvitti
(74) *Attorney, Agent, or Firm* — Patent Law Works LLP

(57) ABSTRACT

The invention discloses a method for preparing mesoporous sound-absorbing material particles and mesoporous sound-absorbing material particles. The preparation method comprises the following steps. In step 1, sound-absorbing material powder and a templating agent are mixed with a binding agent and water to form sol slurry, the templating agent is an organic monomer or a linear polymer, and the templating agent has a purity greater than 95%. In step 2, the sol slurry is dropped into forming oil, and the droplets of the sol slurry are aged in the forming oil to form gel particles. In step 3, the gel particles are taken out from the forming oil and the gel particles are dried to form mesoporous sound-absorbing
(Continued)

step 1, mixing sound-absorbing material powder, a templating agent and a binding agent, and water to form sol slurry, wherein the templating agent is an organic monomer or a linear polymer, and the purity of the templating agent is greater than 95%

↓ step 2, dropping the sol slurry into forming oil, wherein the droplets of the sol slurry are aged in the forming oil to form gel particles

↓ step 3: taking out the gel particles from the forming oil, and drying the gel particles to form mesoporous sound-absorbing material particles

↓ step 4, baking the mesoporous sound-absorbing material particles material particles. In step 4, the mesoporous sound-absorbing material particles are roasted.

18 Claims, 1 Drawing Sheet

(51) Int. Cl.
| | | |
|---|---|---|
| *G10K 11/165* | (2006.01) | |
| *C04B 38/00* | (2006.01) | |
| *G10K 11/162* | (2006.01) | |
| *H04R 1/28* | (2006.01) | |
| *C04B 111/52* | (2006.01) | |

(52) U.S. Cl.
CPC ........ *C04B 38/0067* (2013.01); *C04B 38/062* (2013.01); *G10K 11/162* (2013.01); *G10K 11/165* (2013.01); *C04B 2111/52* (2013.01); *H04R 1/288* (2013.01)

(56) References Cited

U.S. PATENT DOCUMENTS

| | | | |
|---|---|---|---|
| 2014/0341958 A1* | 11/2014 | Gosselin | A61K 8/025 |
| | | | 424/401 |
| 2016/0236165 A1* | 8/2016 | Gosselin | A61K 8/922 |
| 2016/0325269 A1* | 11/2016 | Bazer-Bachi | B01J 35/023 |
| 2018/0354862 A1* | 12/2018 | Cao | C04B 38/0615 |
| 2019/0035375 A1* | 1/2019 | Cao | G10K 11/162 |
| 2019/0051280 A1* | 2/2019 | Cao | G10K 11/162 |
| 2019/0062170 A1* | 2/2019 | Cao | C01B 39/02 |
| 2019/0092700 A1* | 3/2019 | Cao | C04B 38/0045 |
| 2019/0139527 A1* | 5/2019 | Cao | C08K 3/36 |
| 2020/0037066 A1* | 1/2020 | Feng | C01B 39/04 |

FOREIGN PATENT DOCUMENTS

| | | |
|---|---|---|
| CN | 102765737 A | 11/2012 |
| CN | 104549553 A | 4/2015 |
| CN | 204350287 U | 5/2015 |
| CN | 204498347 U | 7/2015 |
| CN | 105503247 A | 4/2016 |

OTHER PUBLICATIONS

First Search, Chinese Application No. 201510888059.3, filed Dec. 3, 2015, 1 page.
International Search Report, PCT/CN2016/082475, dated Sep. 9, 2016, 2 pages.
Written Opinion of the International Search Authority, PCT/CN2016/082475, dated Sep. 9, 2016, 4 pages.
Chinese Office Action for Chinese Application No. 201510888059.3, dated Jun. 13, 2017, 12 pages.
Notification to Grant Patent Right for Invention CN Application No. 201510888059.3, dated Jan. 8, 2018, 3 pages.

* cited by examiner step 1, mixing sound-absorbing material powder, a templating agent and a binding agent, and water to form sol slurry, wherein the templating agent is an organic monomer or a linear polymer, and the purity of the templating agent is greater than 95%

↓ step 2, dropping the sol slurry into forming oil, wherein the droplets of the sol slurry are aged in the forming oil to form gel particles

↓ step 3: taking out the gel particles from the forming oil, and drying the gel particles to form mesoporous sound-absorbing material particles

↓ step 4, baking the mesoporous sound-absorbing material particles

METHOD FOR PREPARING MESOPOROUS SOUND-ABSORBING MATERIAL PARTICLES AND MESOPOROUS SOUND-ABSORBING MATERIAL PARTICLES

CROSS-REFERENCE TO RELATED APPLICATIONS

This application is a National Stage of International Application No. PCT/CN2016/082475, filed on May 18, 2016, which claims priority to Chinese Patent Application No. 201510888059.3, filed on Dec. 3, 2015, both of which are hereby incorporated by reference in their entireties.

FIELD OF THE INVENTION

The present invention relates to the technical field of material processing, and in particular, to a method for preparing mesoporous sound-absorbing material particles and mesoporous sound-absorbing material particles.

BACKGROUND OF THE INVENTION

In recent years, as wearable electronic products have increasingly become thinner and lighter, traditional foaming sound-absorbing materials have failed to meet the requirements of tuning and calibration of acoustic performance in the micro-speaker industry. Those skilled in the art constantly develop and try new types of sound-absorbing materials. After verification, it was found that placing a porous sound-absorbing material in the rear chamber of the speaker device can effectively improve its acoustic performance. At present, this new type of sound-absorbing materials with good application effects include non-foaming sound-absorbing materials such as natural zeolite, activated carbon, white carbon black, and zeolite powder having a silica-alumina ratio of 200 or more. In the application process, the above powdery non-foaming sound-absorbing material needs to be prepared into particles first, and then the sound-absorbing material particles are filled into the rear chamber of the speaker.

However, in the existing preparation processes, the commonly used granulation methods do not fully exert the performance of such non-foaming sound-absorbing materials. In general, the preparation methods used by those skilled in the art include extrusion, granulation by boiling, rolling into balls, and the like. However, after actual usage and testing, the inventors of the present invention have found that the strength of the particles obtained by the extrusion method, the boiling granulation method, and the rolling-into-ball method are relatively poor in strength, the surface is not smooth and the particle size is uneven, and the physical structure and performance are restricted to a certain extent. The sound-absorbing material particles have a limited sound-absorbing effect and may affect the flow of air in the rear chamber of the speaker. However, the particles formed by spray drying method are relatively small, the particle size distribution is not uniform, and the sound-absorbing effect does not reach the expected level. Therefore, the inventors of the present invention believe that the existing sound-absorbing material particles cause two problems after being filled into the rear acoustic chamber of the speaker structure. First, the air flow in the rear chamber is hindered. As a result, the sensitivity of the speaker is reduced. The negative pressure generated in the rear chamber affects the normal operation of the speaker vibration diaphragm. Second, the sound-absorbing effect of the sound-absorbing material particles is limited, and there is still room for improvement.

In summary, it is necessary to improve the structure of the sound-absorbing material particles or the structure of the sound-absorbing material particles, increase the number of passages, improve the sound-absorbing effect of the material, and prevent the sound-absorbing material particles from reducing the smoothness of air entering and exiting the rear chamber of the speaker.

SUMMARY OF THE INVENTION

It is an object of the present invention to provide a new technical solution for preparing sound-absorbing material particles.

According to a first aspect of the present invention, there is provided a method for preparing mesoporous sound-absorbing material particles, comprising the following steps.

In step 1, sound-absorbing material powder, a templating agent and a binding agent, and water are mixed to form sol slurry, the templating agent is an organic monomer or a linear polymer, and the purity of the templating agent is greater than 95%.

In step 2, the sol slurry is dropped into forming oil, and droplets of the sol slurry are aged in the forming oil to form gel particles.

In step 3: the gel particles are taken out from the forming oil, and the gel particles are dried to form mesoporous sound-absorbing material particles.

In step 4, the mesoporous sound-absorbing material particles are roasted.

Optionally, in step 1, the proportion of the added templating agent is 1%-35% of the total mass of the sol slurry.

Optionally, in step 1, the added binding agent is 1% to 35% of the total mass of the sol slurry, and the binding agent is organosilicon sol or fibrous resin.

Optionally, in step 1, an auxiliary agent is added to the sol slurry, a ratio of the added auxiliary agent is 0.02%-10% of the total mass of the sol slurry, and the auxiliary agent is a defoaming agent, a coagulant or a homogenizer.

Optionally, in step 2, the forming oil has a temperature range of 40-120° C., and the forming oil is white lubricating oil, stator oil, machine tool oil, or vacuum pump oil.

Optionally, in step 3, the gel particles are dried in an inert gas at a temperature in a range of 40-150° C.

Optionally, in step 4, the temperature during roasting is in a range of 120-850° C., the heating rate of the roasting is in the range of 20-120° C./h, and the roasting time is in a range of 0.5-96 h. More preferably, in step 4, the oxygen content in the roasting atmosphere is 0.1% to 21%.

The invention also provides a mesoporous sound-absorbing material particle, and the mesoporous sound-absorbing material particle has a specific surface area in a range of 250-650 $m^2/g$ and a pore volume of 0.2-2.0 ml/g. In the mesoporous sound-absorbing material particle, the mesoporous volume with a pore size of 0.5-35 μm accounts for 15%-85% of the total pore volume.

Optionally, the mesoporous sound-absorbing material particle has a diameter in a range of 0.05-1.0 mm and a bulk density in a range of 0.25-0.95 g/ml.

The inventors of the present invention have found that those skilled in the art generally prepare the sound-absorbing material particles by using the existing technical means introduced in the background art and directly use the particles produced by these means without exploring new molding processes or improving structural characteristics of the particles. That is, those skilled in the art are not aware of the problems in the using process of existing non-foaming sound-absorbing material particles. Therefore, the technical task to be realized or the technical problem to be solved by the present invention is never conceived of or is not expected by those skilled in the art. Therefore, the present invention is a new technical solution.

Other features and advantages of the present invention will become apparent from the following detailed description of exemplary embodiments of the present invention with reference to the accompanying drawings.

BRIEF DESCRIPTION OF THE DRAWINGS

The accompanying drawings, which are incorporated in and constitute a part of the description, illustrate embodiments of the present invention and, together with the description thereof, serve to explain the principles of the present invention.

FIG. 1 is a block diagram of steps of a method for preparing a mesoporous sound-absorbing material particle provided by the present invention.

DETAILED DESCRIPTION OF THE EMBODIMENTS

Various exemplary embodiments of the present invention will now be described in detail with reference to the accompanying drawings. It should be noted that the relative arrangement, numerical expressions and numerical values of the components and steps set forth in these examples do not limit the scope of the invention unless otherwise specified.

The following description of at least one exemplary embodiment is in fact merely illustrative and is in no way intended as a limitation to the present invention and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

A embodiment of the invention provides a method for preparing mesoporous sound-absorbing material particles, which includes the following steps.

In step 1, sound-absorbing material powder, a templating agent and a binding agent, and water are mixed to form sol slurry, the templating agent is an organic monomer or a linear polymer, and the purity of the templating agent is greater than 95%. In step 2, the sol slurry is dropped into the forming oil, and droplets of the sol slurry are aged in the forming oil to form gel particles. In step 3, the gel particles are taken out from the forming oil and the gel particles are dried to form mesoporous sound-absorbing material particles. In step 4, the mesoporous sound-absorbing material particles are roasted.

The preparation method provided by the present embodiment is an oil column forming method. In step 1, the sound absorbing material powder is mixed with a binding agent and water to form sol-like sol slurry. In particular in step 1, it is necessary to add a templating agent having a structure-directing function to the sol slurry, and the templating agent provides a structural framework for the re-crystallization of the sound-absorbing material powder and plays a structural guiding role. Depending on the different nature of the templating agent, the sound-absorbing material can be guided to form different crystal structures. Since the mesoporous sound-absorbing material particles are ultimately required to be formed, the templating agent needs to be able to produce a large number of mesoporous structures in the mesoporous sound-absorbing material particles, so as to improve the sound absorption effect and the air fluency. In step 1 of the present embodiment, the templating agent is an organic monomer or a linear polymer, and its purity is more than 95%. Thus, the templating agent can play a role in the subsequent steps, so that when the sound-absorbing material is re-crystallized, a large number of mesoporous structures are formed.

Specifically, in step 1, the ratio of the added templating agent is between 1% and 35% of the total mass of the sol slurry. If the amount of the added templating agent is too high, it may cause that the produced mesoporous sound-absorbing material particles are unstable in structure and low in strength. If the amount of the added templating agent is too low, it may cause that the produced mesoporous sound-absorbing material particles have too few mesoporous structures and micropores, and the sound-absorbing effect is poor. Those skilled in the art can properly adjust the amount of the templating agent used according to the actual situation, so that the produced mesoporous sound-absorbing material particles and the speaker structure can be matched to exert the sound-absorbing effect to the maximum extent.

Preferably, in step 1, the mass proportion of the binding agent in the sol slurry should be between 1% and 35%. If the proportion of the binding agent is too high, it may cause the formed mesoporous sound-absorbing material particle structure to be too tight, resulting in poor sound absorption effect. Conversely, if the proportion of the binding agent is too low, the mesoporous sound-absorbing material particles will eventually fail to solidify into balls. The mass ratio of the binding agent in the sol slurry should be matched with the mass ratio of the templating agent, and those skilled in the art can adjust according to actual conditions. The binding agent may be a material such as silicon oxide, organosol, inorganic silicon powder or fiber resin, which is not limited in the present embodiment.

More preferably, in step 1, an auxiliary agent may also be incorporated, and the auxiliary agent may be a defoaming agent, a coagulant, a homogenizer, or the like. The auxiliary agent assists the auxiliary binding agent and the templating agent, and promotes sound-absorbing material powder to form the mesoporous sound-absorbing material particles. In general, the auxiliary agent is 0.02%-10% of the total mass of the sol slurry.

In addition, the sound-absorbing material powder may be natural zeolite powder, active silica, white carbon, activated carbon, molecular sieve or the like, and may be a mixture of different zeolite-based sound-absorbing material powders in specific ratios. The present embodiment does not limit the material of the sound-absorbing material powder, and those skilled in the art can adjust according to actual needs.

In step 2 of the present embodiment, the above-prepared sol slurry is dropped into the forming oil so that the sol droplets gradually age and solidify to form gel particles which are uncompleted mesoporous sound-absorbing material particles. The size of the droplets of the sol slurry dripped into the forming oil directly affects the size of the mesoporous sound absorbing material particles. In order to make the size of the mesoporous sound absorbing material particles reach the normal use and the size of the speaker rear chamber, the diameter of the sol slurry droplets is usually between 100-400 microns.

Generally, the temperature of the forming oil is higher than normal temperature. Optionally, the temperature of the forming oil may be in a range of 40-120° C., and the forming oil may be white lubricating oil, stator oil, machine tool oil, vacuum pump oil, edible oil, or a mixture of lubricating oil and aliphatic hydrocarbons. The present embodiment does not specifically limit the types of the forming oils, and those skilled in the art can select different oils as the forming oil according to the requirements of the passages, profile, size and surface smoothness of the mesoporous sound-absorbing material particles that are actually required to be generated.

In step 2, the formulated and sufficiently and uniformly processed sol slurry in step 1 may be placed in the forming oil by means of titration, atomization or the like. Under the effect of the temperature and liquid properties of the forming oil, the droplets of the sol slurry will react, and the sound-absorbing material powder in the droplets of the sol slurry will begin to age, accumulate, gradually solidify and crystallize under the action of the binding agent. At this time, the templating agent in the droplets will occupy a portion of the space in the droplets, forming a large number of mesoporous structures, and also can cut large bubbles formed during the aging of the droplets to form several small bubbles, so that the gradually crystallized and solidified gel particles have a large number of ordered mesoporous structures.

The gel particles will be eventually in a substantially solidified form. In step 3, the substantially shaped gel particles are taken out from the forming oil and dried to form mesoporous sound-absorbing material particles. In particular, in the drying process, an inert gas may be used as a medium to prevent the polar defect sites in the microstructure of the gel particles from reacting with active molecules in the air. The inert gas may be nitrogen. In addition, the gel particles may also be dried at a certain temperature. Alternatively, the gel particles may be placed in an inert gas at a temperature between 40-150° C. In this way, the liquid and forming oil in the gel particles can be discharged more effectively. The time of the drying process is allowed to be between 0.5-96 hours. Those skilled in the art can adjust the parameters in the drying process according to the situation of the actual application to the speaker structure and the acoustic properties of the mesoporous sound-absorbing material particles and correspondingly set a specific temperature curve and drying medium.

Further, after step 3, the liquid in the mesoporous sound-absorbing material particles has been substantially discharged. However, due to the preparations of the binding agent and the templating agent added in the processing step, the mesoporous sound-absorbing material particles are also doped with impurities. In step 4 of the present embodiment, the mesoporous sound-absorbing material particles are also required to be subjected to a roasting treatment to remove the impurities therein and discharge the remaining liquid molecules. However, the roasting temperature and time will affect the microstructure of the mesoporous sound-absorbing material particles. With proper control, the degree of crystallization can be increased and the structural stability of the lattice can be improved. However, if not properly controlled, the crystal structure will be damaged, which directly affects the sound absorption effect of the mesoporous sound-absorbing material particles. Therefore, under normal circumstances, the range of the roasting processing temperature should be between 120-850° C., the roasting time should be between 0.5-96 hours. In particular, the heating rate during roasting cannot be too fast, and if the heating rate is too high, the microstructure of the mesoporous sound-absorbing material particles will be seriously damaged. Generally, the heating rate of the roasting is in a range of 20-120° C./h. When the roasting temperature is selected to be moderate, for example, 350° C., the heating rate of 45° C./h can be selected for the roasting, and the roasting time is 30 hours. In this way, the liquid molecules in the mesoporous sound-absorbing material particles can be substantially removed, and impurities in the templating agent and the binding agent can be eliminated. After the impurities are eliminated, the mesoporous structure of the mesoporous sound-absorbing material particles can be activated to ensure smoothness of the mesoporous structure of the mesoporous sound-absorbing material particles without damaging the microstructure. Preferably, the roasting process may have a temperature range of 280-550° C. and a roasting time range of 20-65 hours, and the heating rate of the roasting is in a range of 25-65° C./hour. The above temperature and time ranges generally do not damage the microstructure of the mesoporous sound-absorbing material particles and can substantially remove liquid molecules and impurities. The embodiment does not accurately limit the temperature, time and heating rate of roasting, and those skilled in the art can adjust these parameters according to actual conditions. The broad temperature, time, and heating rate ranges described by the present embodiment include situations that can be used in some special cases.

More preferably, in step 4, the content of oxygen in the furnace gas atmosphere during the roasting may be between 0.1-21%. The presence of oxygen can activate the mesoporous structure in the mesoporous sound-absorbing material particles to a certain extent, eliminate impurities in the mesoporous structure, enable mesoporous sound-absorbing material particles to have a good sound-absorbing effect, and the air circulation is smooth. Those skilled in the art can select the content of oxygen according to actual conditions, or can also add a small amount of other active atmosphere in the atmosphere of the roasting furnace gas, which is not limited by the present embodiment.

The preparation method provided by the present embodiment introduces the mesoporous structure into the sound-absorbing material particles through the action of a templating agent. The mesoporous structure is uniform and orderly, and the flow velocity of air molecules in the rear chamber of the speaker can be greatly increased, so that the mesoporous sound-absorbing material is matched with the millisecond response level of the applied speaker structure. Under the negative pressure condition, the effective instantaneous adsorption-desorption completion degree is significantly increased, which greatly improves the optimization testing effect of the acoustic performance of the speaker structure. In addition, the mesoporous structure can effectively improve the sound absorption effect of the sound-absorbing material particles.

Further, the present embodiment also provides mesoporous sound-absorbing material particles, which can be directly prepared by the above method. The specific surface area of the mesoporous sound-absorbing material particles ranges from 250 to 650 $m^2$/g, and the pore volume thereof is 0.2-2.0 ml/g. Among the mesoporous sound-absorbing material particles, the pore volume of the mesoporous with a pore size of 0.5-35 μm accounts for 15%-85% of the total volume of the pore volume. Preferably, the mesoporous sound-absorbing material particles have a diameter in a range of 0.05-1.0 mm. The mesoporous sound-absorbing material particles having a diameter in this range can generally be applied to the rear chamber of most speaker structures, and the bulk density thereof is generally in a range of 0.25-0.95 g/ml. The diameter of the mesoporous sound-absorbing material particles is affected by the diameter of the droplets of the sol slurry dripped into the forming oil in step 2 of the above method. Those skilled in the art can test the parameters of the sound-absorbing material particles according to the speakers of various rear sound chamber structures.

While certain specific embodiments of the present invention have been illustrated by way of example, it will be understood by those skilled in the art that the foregoing examples are provided for the purpose of illustration and are not intended to limit the scope of the present invention. It will be understood by those skilled in the art that the foregoing embodiments may be modified without departing from the scope and spirit of the invention. The scope of the present invention is subject to the attached claims.

What is claimed is:

1. A method for preparing mesoporous sound-absorbing material particles, comprising:
   step 1: mixing sound-absorbing material powder, a templating agent, a binding agent, and water to form a sol slurry, wherein the templating agent is an organic monomer or a linear polymer, and a purity of the templating agent is greater than 95%;
   step 2: dropping the sol slurry into forming oil, wherein droplets of the sol slurry are aged in the forming oil to form gel particles;
   step 3: taking out the gel particles from the forming oil, and drying the gel particles to form unroasted mesoporous sound-absorbing material particles; and
   step 4: roasting the unroasted mesoporous sound-absorbing material particles to form the mesoporous sound-absorbing material particles.

2. The method according to claim 1, wherein in step 1, a proportion of the mass of the templating agent to the total mass of the sol slurry ranges from 1% to 35%.

3. The method according to claim 1, wherein in step 1, the proportion of the mass of the binding agent to the total mass of the sol slurry ranges from 1% to 35%, and the binding agent is organosilicone sol or fibrous resin.

4. The method according to claim 1, wherein in step 1, an auxiliary agent is added to the sol slurry, the proportion of the mass of the auxiliary agent to the total mass of the sol slurry ranges from 0.02% to 10%, and the auxiliary agent is a defoaming agent, a coagulant, or a homogenizer.

5. The method according to claim 1, wherein in step 2, the temperature of the forming oil ranges from 40 to 120° C.

6. The method according to claim 1 which produces a mesoporous sound-absorbing material particle, wherein the mesoporous sound-absorbing material particle has a specific surface area in a range of 250-650 m2/g and a pore volume in a range of 0.2-2.0 ml/g, and in the mesoporous sound-absorbing material particle, the pore volume of the mesopores with a pore size of 0.5-35 μm accounts for 15%-85% of the total pore volume.

7. The method according to claim 6 which produces the mesoporous sound-absorbing material particle, wherein the diameter of the mesoporous sound-absorbing material particle is in a range of 0.05-1.0 mm and a bulk density thereof is in a range of 0.25-0.95 g/ml.

8. The method according to claim 5, wherein the forming oil is white lubricating oil.

9. The method according to claim 5, wherein the forming oil is stator oil.

10. The method according to claim 5, wherein the forming oil is machine tool oil.

11. The method according to claim 5, wherein the forming oil is vacuum pump oil.

12. The method according to claim 5, wherein the forming oil is a mixture of lubricating oil and aliphatic hydrocarbons.

13. The method according to claim 5, wherein the diameter of the droplets of the sol slurry is between 100-400 microns.

14. The method according to claim 5, wherein, in step 2, the dropping the sol slurry into forming oil comprises placing the sol slurry from step 1 in the forming oil by atomization.

15. The method according to claim 1, wherein in step 3, the gel particles are dried in an inert gas in a temperature range of 40-150° C.

16. The method according to claim 1, wherein in step 4, the roasting temperature ranges from 120 to 850° C., a heating rate of the roasting ranges from 20 to 120° C./h, and a time of the roasting ranges from 0.5 to 96 hours.

17. The method according to claim 16, wherein the roasting temperature ranges from 280 to 550° C., the heating rate of the roasting ranges from 25 to 65° C./h, and the time of the roasting ranges from 20 to 65 hours.

18. The method according to claim 16, wherein in step 4, a content of oxygen in the roasting atmosphere ranges from 0.1% to 21%.

* * * * *